United States Patent
Narang et al.

(10) Patent No.: US 8,229,916 B2
(45) Date of Patent: Jul. 24, 2012

(54) METHOD FOR MASSIVELY PARALLEL MULTI-CORE TEXT INDEXING

(75) Inventors: Ankur Narang, New Delhi (IN); Vikas Agarwal, Noida (IN); Vijay Kumar Garg, Haryana (IN); Douglas James Joseph, Danbury, CT (US); Monu Kedia, Jharkhand (IN); Maged M. Michael, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 12/248,430

(22) Filed: Oct. 9, 2008

(65) Prior Publication Data
US 2010/0094870 A1  Apr. 15, 2010

(51) Int. Cl.
*G06F 17/30* (2006.01)

(52) U.S. Cl. ....................................................... 707/711

(58) Field of Classification Search .................. 707/711, 707/741–747, 830
See application file for complete search history.

(56) References Cited

U.S. PATENT DOCUMENTS

| | | | |
|---|---|---|---|
| 5,842,208 A | 11/1998 | Blank et al. | |
| 6,360,234 B2 | 3/2002 | Jain et al. | |
| 6,778,977 B1 | 8/2004 | Avadhanam et al. | |
| 7,240,069 B2 | 7/2007 | Samsonov | |
| 2003/0194007 A1* | 10/2003 | Chen et al. | 375/240.2 |
| 2008/0010238 A1* | 1/2008 | Whyte et al. | 707/2 |
| 2008/0021908 A1* | 1/2008 | Trask et al. | 707/100 |
| 2008/0033986 A1 | 2/2008 | McCusker et al. | |

OTHER PUBLICATIONS

Inderjit S. Dhillon, Efficient Clustering of Very Large Document Collections, 2001, userweb.cs.utexas.edu.*

* cited by examiner

*Primary Examiner* — Thu-Nguyet Le
(74) *Attorney, Agent, or Firm* — Tutunjian & Bitetto, P.C.; Brian P. Verminski, Esq.

(57) ABSTRACT

There is provided, in a parallel pipelined structure on a multi-core device, a method for parallel pipelined multi-core indexing. The method includes generating one or more single document indexes respectively corresponding to one or more single documents of a given data stream. The method further includes generating one or more multi-document interval-based hash tables from the one or more single document indexes. The method also includes generating a global hash table formed from merging one or more of the multi-document interval-based hash tables, the global hash table representing a collective index for all of the single documents for which the one or more single document indexes were generated.

23 Claims, 14 Drawing Sheets

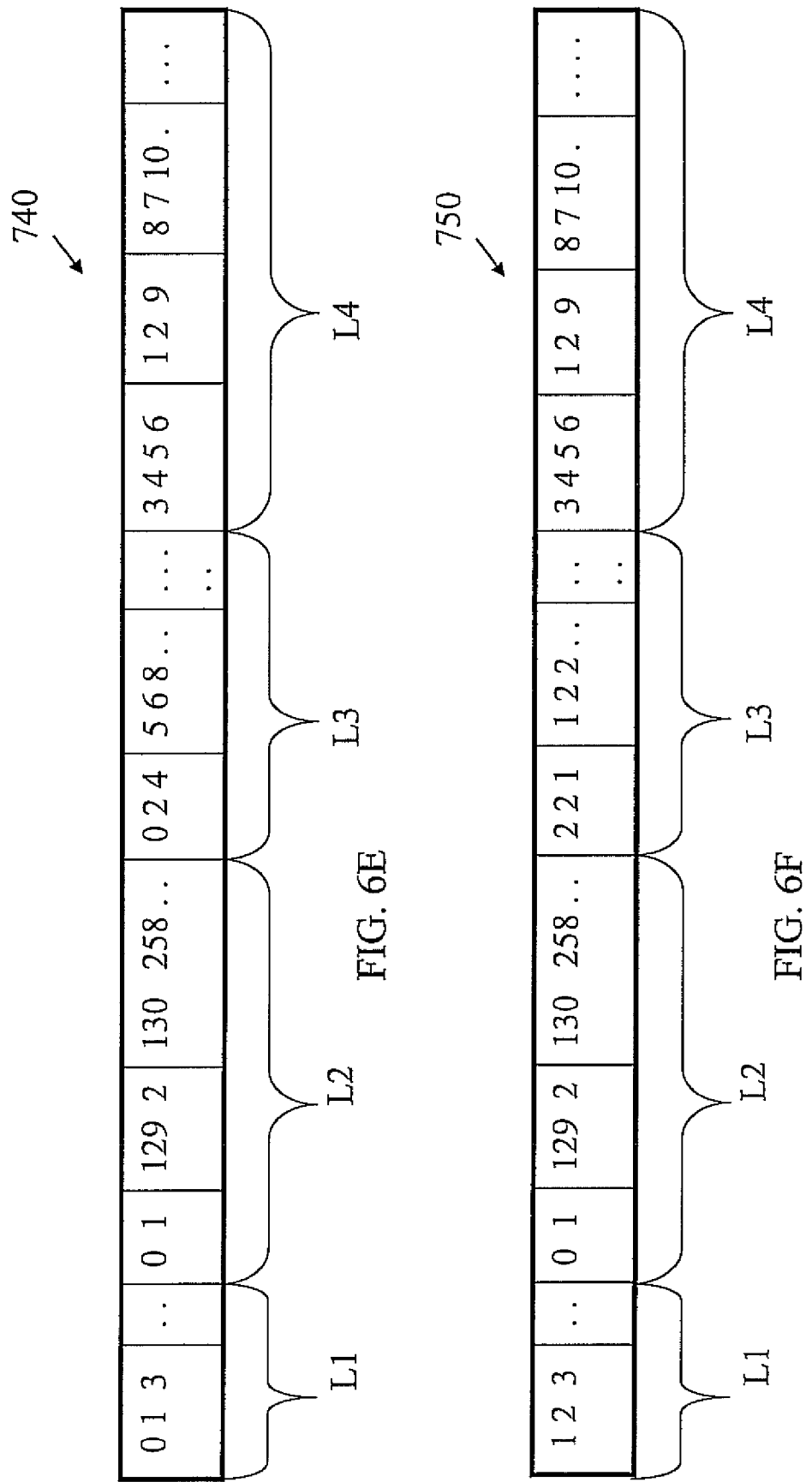

METHOD FOR MASSIVELY PARALLEL MULTI-CORE TEXT INDEXING

GOVERNMENT RIGHTS

This invention was made with Government support under Contract No.: H98230-07-C-0409 awarded by the National Security Agency. The Government has certain rights in this invention.

BACKGROUND

1. Technical Field

The present invention relates to a method for massively parallel multi-core text indexing.

2. Description of the Related Art

Text based search remains an important technique to retrieve data including images, movies, sounds recordings, and so forth. Current distributed information retrieval (IR) systems are expected to maximize search throughput while having low acceptable response times. Current distributed IR systems typically generate a document partitioned index where each index slice is generated by a single node (which could be a single or multi-core processor). Distributed search is performed and search results are then merged to generate the final top-X (50,100) documents for a query. Since disk based accesses are involved in indexing, the indexing speed is limited by memory size and disk access times. Optimization is primarily focused at disk-based storage and distributed access of index and text. However, recent trends including the need for real-time indexing and searching of massive amounts of data, along with the advent of massively parallel (multi-core) architectures and storage class memories, motivate exploration of performance optimizations for in-memory text indexing and search.

Given the size and continuing growth of the Web, the time needed to build an index is a significant factor in providing an effective search output. Also, the fact that the contents available in the Web change extremely rapidly necessitates either efficient incremental index updates or a rebuilding approach. Typically, for efficiency and simplicity, the index rebuilding approach is taken which makes it necessary to have low indexing time over huge volumes of data.

Rapid advances in computer architecture and system software in recent years have produced massively parallel systems. In the near future, one can expect to see massively parallel multi-core systems (e.g., 1K-2K cores) with storage class memories. For such systems, one can store the complete index and text in memory of about couple of hours of data. Thus the index data structures need to be re-designed to attain high indexing rates. One also needs to re-design indexing and search algorithms to execute efficiently on these systems.

Indexing a large number of real-time streams with a high data rate in the order of 1-2 Gigabytes/second (GB/s) is a challenging problem. Such streams are encountered in backbone network routers, sensor networks, and other domains. Such indexing would involve sustained aggregate indexing rates of around 50-100 GB/s or more.

Current multi-core architectures cannot sustain these high aggregate indexing rates. The current text indexing & search based implementations are optimized for disk-based index and text storage. Hence, such implementations will not perform well with high capacity storage-class memories that can store both index and text.

Current conventional text indexing approaches are all somewhat similar. Hence, an overview of conventional text indexing approaches is provided as follows. A conventional text indexing approach such as, for example, Lucene index, covers a set of documents. A document is a sequence of fields. A field is a sequence of terms. A term is a text string. A Lucene index includes one or more segments. Each segment covers a set of documents. Each segment is a fully independent index.

Hence, the Lucene index is organized in segments. Each segment includes information about terms and their frequencies, documents in which they occur and positions in which they occur in the documents. The positions and frequencies are stored in sequential fashion and accessed by adding base position with offset. The terms are also kept sorted for fast binary search during query evaluation. The whole organization is designed to minimize the number of disk accesses as the disk seek time is orders of magnitude larger compared to compute or memory access time. The index also stores skip-lists for documents to enable fast access of documents (in $O(\$\backslash \log (n)\$)$ time), where n: denotes the number of documents.

During the merging of segment indexes, a merge-sort is performed to keep the terms sorted in the merged index and the document IDs are updated to reflect the new set of documents. The control structure for the final merged index is updated at each step to reflect the new merged index. With respect to the Lucene index, there are two key steps involved in merging of segments into a next level segment. The first step involves a k-way merge sort of the sorted-term-lists in "k" segments to be merged. The second step involves reading the document and postings data per unique term and then copying the posting data to the destination segment. As the number of merges increase, this data is again and again read and copied over to successive merged segments. This process along with sorting of terms makes the merge process inefficient.

Hence, the current indexing algorithm in Lucene, as well as similar prior art indexing algorithms, is not scalable. That is, if we double the number of processors for constructing one merged index (for the same data size), indexing may not necessarily get a speedup close to two. This is because the index-merge process quickly becomes the bottleneck.

With respect to conventional text indexing approaches such as the Lucene index, index updates are serialized, multiple index searches can proceed concurrently, and simultaneous index update and search are supported.

However, conventional text indexing approaches are not designed to be strongly scalable (while maintaining the same search performance) on massively parallel architectures including future generation multi-core architectures. The high cost of merging index segments prevents the current conventional text indexing approaches from scaling on larger number of processors.

Document-based text search (e.g., Lucene) is typically designed for low memory workstations with large disks. Disadvantageously, such document-based text search involves a lot of overhead in order to merge indices residing on disks. Further disadvantageous, parameters for document-based text search need to be tuned for multi-core architectures (e.g., repetitive merging of the same index). Also disadvantageous, data structures designed for low memory architectures are inefficient for large memory multi-core architectures.

Hence, in view of the preceding, there is a need to re-design the existing indexing data structures and enable an indexing algorithm to be strongly scalable on massively parallel architectures while maintaining the same search performance as compared to indexing performed on non-massively parallel architectures.

SUMMARY

The shortcomings of the prior art are overcome and additional advantages are provided through the provision of a method for massively parallel multi-core text indexing.

According to an aspect of the present principles, there is provided, in a parallel pipelined structure on a multi-core device, a method for parallel pipelined multi-core indexing. The method includes generating one or more single document indexes respectively corresponding to one or more single documents of a given data stream. The method further includes generating one or more multi-document interval-based hash tables from the one or more single document indexes. The method also includes generating a global hash table formed from merging one or more of the multi-document interval-based hash tables, the global hash table representing a collective index for all of the single documents for which the one or more single document indexes were generated.

According to another aspect of the present principles, there is provided a program storage device readable by machine, tangibly embodying a program of instructions executable by the machine to perform method steps for parallel pipelined multi-core indexing in a parallel pipelined structure on a multi-core device. The method includes generating one or more single document indexes respectively corresponding to one or more single documents of a given data stream. The method further includes generating one or more multi-document interval-based hash tables from the one or more single document indexes. The method also includes generating a global hash table formed from merging one or more of the multi-document interval-based hash tables, the global hash table representing a collective index for all of the single documents for which the one or more single document indexes were generated.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIGS. 6A, 6B, 6C-D, 6E, and 6F are diagrams graphically representing steps 710, 720, 730, 740, and 750, respectively, of FIG. 5, in accordance with an embodiment of the present principles;

DETAILED DESCRIPTION OF PREFERRED EMBODIMENTS

Figure 1:
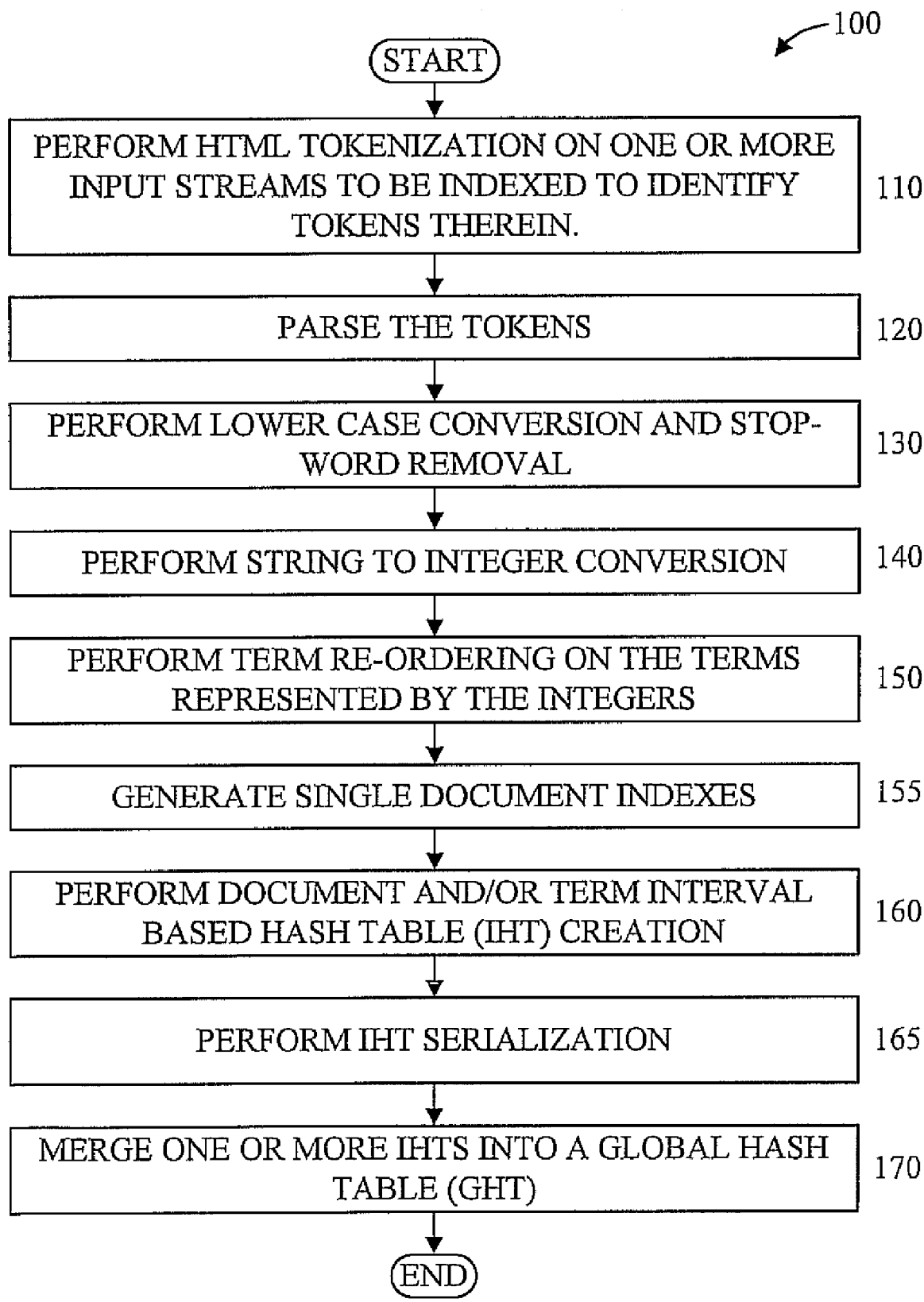
FIG. 1 is a diagram showing an exemplary method 100 for massively parallel multi-core indexing, in accordance with an embodiment of the present principles.

Referring now in detail to the figures in which like numerals represent the same or similar elements and initially to FIG. 1, an exemplary method for massively parallel multi-core indexing is indicated generally by the reference numeral 100. It is preferable, but not mandatory, for method 100 to be implemented in a parallel pipelined structure on a multi-core device with a global address space and a plurality of coherence domains, where each of the plurality of coherence domains have a respective corresponding set of compute units. Of course, given the teachings of the present principles provided herein, one of ordinary skill in this and related arts will contemplate this and other devices and systems to which the present principles may be applied, while maintaining the spirit of the present principles.

At step 110, HTML tokenization is performed on one or more input streams to be indexed to identify tokens therein.

At step 120, parsing of the tokens is performed.

At step 130, lower case conversion and stop-word removal is performed. In particular, in an embodiment, all characters are converted to lower-case (of course, the inverse may be performed), and all stop-words are removed. A "stop-word", also referred to as a "noise word", is a word that is filtered out prior to processing.

At step 140, string to integer conversion is performed. Such conversion may involve, for example, a term dictionary.

At step 150, term re-ordering is performed on the terms represented by the integers obtained (at step 140).

At step 155, single document indexes (LHTs) are generated.

At step 160, document and/or term interval based hash table (IHT) creation is performed.

At step 165, IHT serialization is performed.

At step 170, one or more IHTs are merged into a global hash table (GHT).

It is to be appreciated that some of the above steps of method 100 are not mandatory, but rather optional steps that provide one or more benefits, in addition to the benefits inherent in the overall approach of the present principles. For example, benefits that may be obtained by one or more of the optional steps include optimized merging, improved scalability, and so forth.

Figure 2:
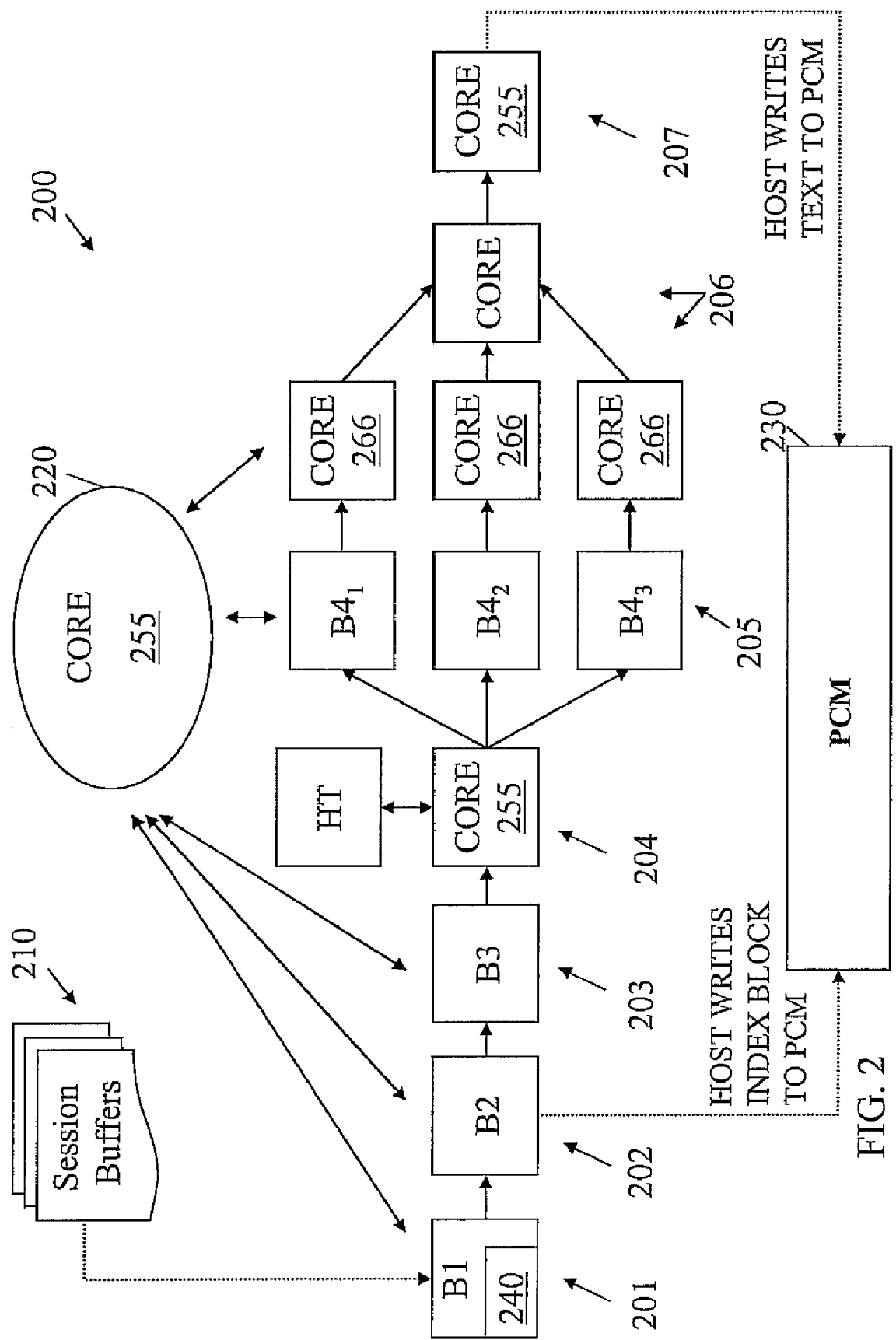
FIG. 2 is a diagram showing a parallel pipelined indexing design 200, in accordance with an embodiment of the present principles.

FIG. 2 is a diagram showing a parallel pipelined indexing design 200, in accordance with an embodiment of the present principles. In an embodiment, the present principles may be implemented in a parallel pipelined indexing design such as a multi-core device with a global address space and a plurality of coherence domains, each of the plurality of coherence domains having a respective corresponding set of compute units.

The design involves seven stages, denoted by the reference numerals 201, 202, 203, 204, 205, 206, and 207. Stages 201, 202, 203, 204, 205, 206, and 207 of FIG. 2 respectively correspond to steps 110, 120, 130, 140, 150, 160, and 170 of FIG. 1. The first stage 201 corresponds to HTML tokenization. The second stage 202 corresponds to parsing. The third stage 203 corresponds to a lowercase conversion and stop word (removal) filter. The fourth stage 204 corresponds to string to integer conversion. The fifth stage 205 corresponds to term reordering. The sixth stage 206 corresponds to IHT creation. The seventh stage 207 corresponds to IHT to GHT merging.

One or more session buffers 210 provide input to the first stage 201. The control flow of the first through sixth stages 201-206 are coordinated by a core 220. The reference character "B" denotes hardware accelerators for pattern scanning functions including, but not limited to, pattern matching, html parsing, tokenization, stop-word removal and lowercase conversion. The reference characters "HT" denote hash table. Cores shown include cores 255 and cores 266. Cores 255 may be, but are not limited to, a core having low memory access latency, such as a "light" core that is physically closer to a large memory (than cores 266). Cores 266 may be, but are not limited to, a "light" core having high memory latency but satisfactory compute capacity and implemented in a clustered configuration. Core 220 includes one or more cores 255 that are used as described herein below. Cores 266 may be, but are not limited to, specialized cores such as, for example, in a hybrid multi-core architecture. Moreover, any of cores 255 and 266 may be specialized cores, general cores, and a mix thereof. Depending upon the implementation, one or more cores may be respectively used, for example, for each separate function in the pipelined multi-core device. These and other variations of the elements of FIG. 2 are readily implemented given the teachings of the present principles provided herein, while maintaining the spirit of the present principles.

A host writes text from the second stage 202 to a phase-change memory (PCM) 230. A host writes an index block from the seventh stage 207 to the PCM 230.

Single stream processing will now be described.

With respect to a start point for the single stream processing, the one or more session buffers 210 may be used in an embodiment. In an embodiment, a host thread assigns a session buffer to a pattern scanning engine. The pattern scanning engine 240 performs HTML tokenization and parses and writes text data to a text buffer in main memory (in the first stage 201).

In Parallel, the core 220 creates the document data structure, and the host thread writes text data to the PCM (in the second stage 202).

The pattern scanning engine 240 performs tokenization, lowercase conversion and stop-word removal and injects into the L2 cache of the core 220 (in the third stage 203).

The core 220 converts token strings to integers using a term dictionary (in the fourth stage 204).

The core 220 assigns integer token buffer to the pattern scanning engine 240.

The pattern scanning engine 240 performs term re-ordering on integer token buffer.

The cores 266 DMA ordered integer token buffer into a local store (LS). The LHT generated by the pattern-scanner post-processing engines, is transferred via DMA to the local store memory of the "light-core". The cores 266 create a multiple document index, i.e. Interval Hash Table (IHT) and DMA the IHT to main memory.

The Core 220 is responsible for merging the IHT into the GHT.

The host thread sends GHT index blocks to the PCM 230.

It should be understood that the elements shown in the FIGURES may be implemented in various forms of hardware, software or combinations thereof. Preferably, these elements are implemented in software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As noted above, the present principles are directed to massively parallel multi-core text indexing. In distributed information retrieval (IR) environments, one way to deal with massive amounts of data and have stringent constraints on response times is to have a distributed index by partitioning the total input data across groups of nodes and to construct a single index per group (instead of per node basis). This group-index is constructed by merging the indexes from each node in the group. Such a group-based construction helps in reducing the number of nodes involved in a search which helps in reducing the search response time, especially in cases where global scoring requires a lot of communication between the search nodes.

In an embodiment, the present principles are directed to the design of efficient data structures for indexing that provide strong scalability while maintaining and/or improving search performance. The new data structures are based on document and/or term-interval based hash tables (IHT) that are stored in an efficient format in the memory. These new data structures represent an index over a limited set of documents. These new data structures are then merged into a large global hash table (GHT) that maintains the index for a large number of documents and is stored efficiently in one contiguous memory block. In an embodiment, such contiguous memory block may have a total size of around 512 Megabyte (MB) to 1 Gigabyte (GB) or more depending on the memory available. Of course, other sizes may be used while maintaining the spirit of the present principles.

Since the IHTs can be computed efficiently on small cores with small memories and the merging of the IHTs into the GHT is of negligible cost, this indexing solution is "strongly" scalable, which is not the case with the current solutions in text indexing.

It is to be appreciated that the data-structures and indexing methods described herein in accordance with the present principles are independent of the architecture. thus, given the teachings of the present principles provided herein, one of ordinary skill in the art will readily appreciate that applicability of the data structures and indexing methods of the present principles to clusters, a cluster(s) of scalable multi-processors (SMPs), large-scale SMPs, multi-purpose processors (MPPs), and other distributed architectures.

As noted above, the present principles are directed to a method for massively parallel multi-core text indexing. The method has "strong" scalability, as compared to prior art solutions directed to parallel multi-core text indexing.

For the same hypertext markup language (html) data to index as compared to the prior art solutions, the present principles reduce the indexing time with a corresponding increase in the available number of processors. Moreover, the present principles advantageously maintain or improve the search performance over conventional indexing solutions. As noted above, the conventional text indexing approach has limited scalability in indexing due to the corresponding expensive merge step.

The present principles provide parallel scalable indexing. To that end, a new index data structure design is provided. The new index data structure design a document interval and/or term-interval based hash-table (IHT) design for maximizing scalability with more processors. Moreover, the new index data structure design provides an efficient global hash table (GHT) design for maximal indexing performance. Further, the merging of IHTs into the GHT is less expensive than the merging step of conventional text indexing approaches.

The merging process at the GHT can be further improved using term-based partitioning. In such a case, there are multiple GHTs instead of a single GHT. Each GHT represents an index for a collection of documents but for a particular set of terms. All the GHTs generated in a term-based partitioned index represent the complete index for the collection of documents. Term-based partitioning reduces the load on the compute unit that merges the IHT into the GHT by spreading this load onto multiple compute units, each of which create one GHT for its set of terms.

As noted above, the index format of conventional text indexing approaches is not optimized for in-memory index storage and query searching. Hence, we design new data structures for index storage. To eliminate the need to sort the terms, we use hash-tables and terms/documents as keys in the hash-tables. To reduce the inefficiency in the merge process of repeatedly re-organizing document and postings data into higher level segments, we propose a 2-dimensional hash-table based approach. In this approach, we keep a top-level hash-table (i.e., the global hash table (GHT)) that maps unique terms in the document collection to a second-level hash table. In the second-level hash-table (i.e., the document interval hash table (IHT)), the key is a range of documentIDs (document-interval) and the value is the detailed document and postings data for that term (in the GHT). This avoids repeated re-organization of data in the segment indexes that get merged in the final merged index and, hence, makes the merge process more efficient compared to conventional text indexing approaches. This merge efficiency cannot be attained in a single-dimensional hash table.

Thus, we use a 2-dimensional hash table structure in memory to store the inverted-index for a collection of documents. The first dimension is for terms (including Field Name) and the second dimension is for the range of documentIDs. For each term entry, there is a second level hash table which is indexed by the range of documentIDs. After indexing by documentID-interval into this second-level hash table, we get the list of documents that include that term and for each document we get the details on frequency of the term in the document and a pointer(s) to the list of positions of occurrence of the term in the document.

An indexing algorithm in accordance with an embodiment of the present principles may be considered to include three main steps. The first step involves constructing a posting table (hash-table) for each single document without doing any sorting of terms. Then, the posting tables of "k" documents are merged into an IHT, which are then encoded appropriately. Finally, the encoded IHTs are merged into a single GHT in an efficient manner. These top-level steps are similar to conventional text indexing approaches, but the new data-structures used (e.g., the IHT and GHT) and the efficient merge process make our indexing algorithm faster and more scalable with respect to the prior art.

Figure 3:
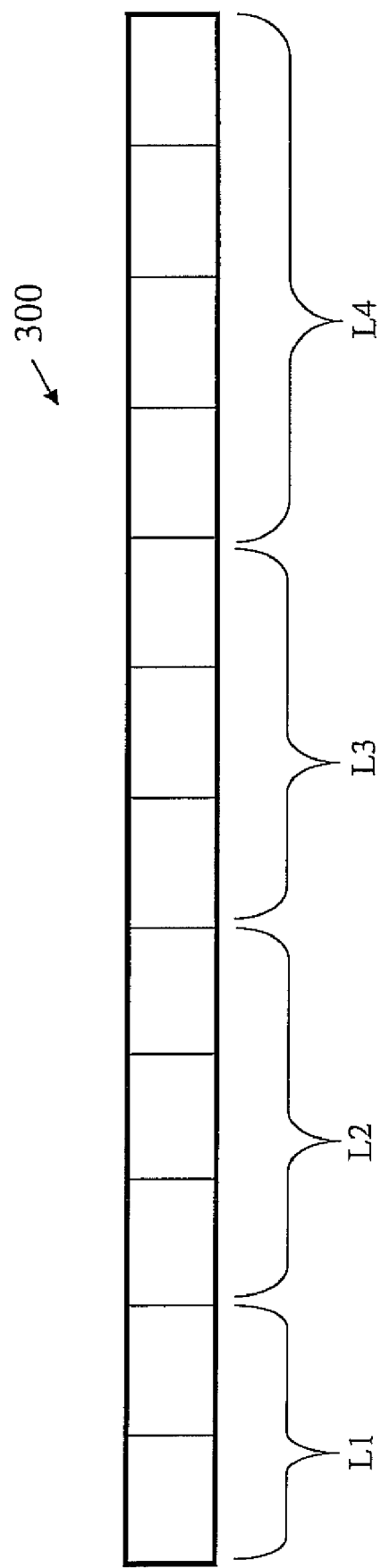
FIG. 3 is a diagram showing a single document index 300, in accordance with an embodiment of the present principles.

FIG. 3 is a diagram showing a single document index 300, in accordance with an embodiment of the present principles. The single document index 300 is also interchangeably referred to herein by the term "LHT", In the single document index or LHT, |L1| denotes the hash table size. L1 includes the number of distinct words mapped to this Hash Table entry.

|L2| denotes the number of distinct words in the document. L2 includes the identifier (ID) of the words in the order of their hash value.

|L3| denotes the number of distinct words. L3 includes the frequency of the words in the document. The order of frequency appearance is the same as the order of ID appearance in L2.

|L4| denotes the number of words in the document. L4 includes the position of the words in the document. The order of position appearance is the same as the order of ID appearance in L2.

A description of several exemplary optimizations for single document indexing on light cores will now be described. Light cores are small compute units that have limited cache/memory available locally with them. A massively parallel multi-core device includes a large number of "light" cores.

One such optimization involves SIMDization. The term SIMDization refers to a vector operation including, but not limited to, vector-add, vector-sub, and so forth, of a collection of data elements. An operation such as add/sub on several data elements can be combined into a single SIMD operation provided the underlying architecture supports it and the operations are not dependent on each other. This results in a performance gain equal to the degree of SIMDization compared to the original sequential code. With respect to SIMDization, the following may be performed. With respect to hash function computation per term, multiple terms may be used in parallel when they are involved in the computation of the same hash function. With respect to multiple hash functions per term, multiple hash functions may be used in parallel. SIMDization could also be performed in memory access in the case when the underlying architecture provides a vector scatter/gather operation.

Another optimization for single document indexing on light cores involves instruction scheduling and static branch prediction.

Moreover, another optimization for single document indexing on light cores involves a static array for serialized single document index (LHT) generation. For the construction of the static array, term-frequency statistics per document may be used to optimize memory allocation. Advantages of the static array include, but are not limited to, avoiding repeated dynamic memory allocation calls which could have high overheads, avoiding memory fragmentation which can be expensive on small cores, cache performance improvement and enabling compiler performance optimizations for the generated object code.

Figure 4A:
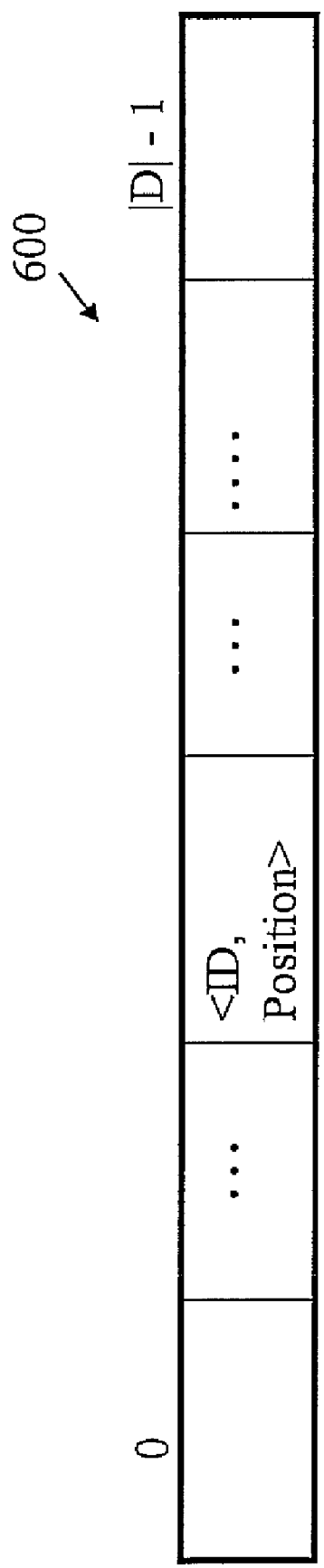
FIGS. 4A and 4B are diagrams respectively showing an input array D 600 and an input array F 650 for serialized LHT generation, in accordance with an embodiment of the present principles.
Figure 4B:
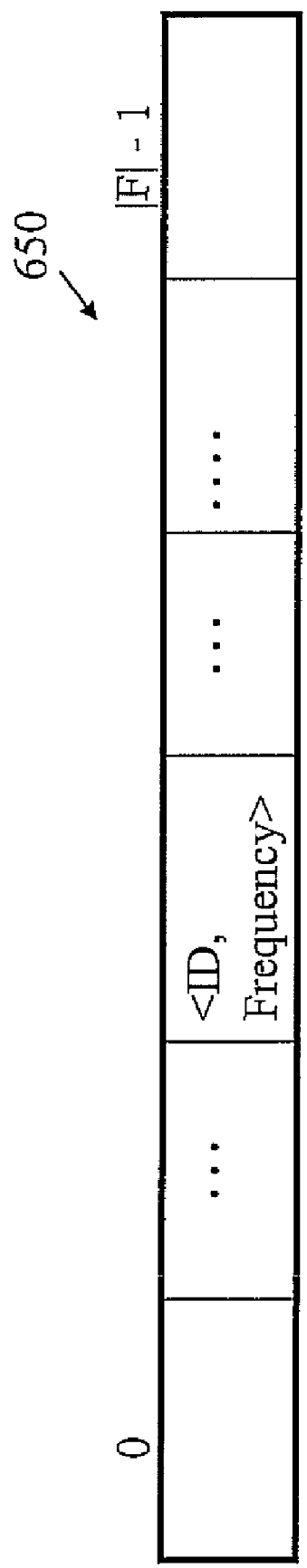

FIGS. 4A and 4B are diagrams respectively showing an input array D and an input array F for serialized LHT generation, in accordance with an embodiment of the present principles. The array D and the array F are also interchangeably denoted herein by the reference numerals 600 and 650, respectively. The array D is arranged such that each element is a pair of integers including the ID and the position of a word in a document. The array F is arranged such that each element is a pair of integers including the ID and the frequency of a word in a document.

|D| denotes the total number of words in the document. |F| denotes the number of distinct words in the document.

Referring back to FIG. 3, a description of serialized LHT generation with respect to an output thereof will now be described, in accordance with an embodiment of the present principles.

Array LHT is arranged such that each element is an integer, such that: $|LHT|=|HT\_SIZE|+2*|F|+|D|$; where |LHT| is the size of the LHT array The following semantics may be applied:

With respect to a first semantic, for $0 \leq i < |HT\_SIZE|$, $LHT[i]=\Sigma HF(ID)=i$. LHT[i] denotes the number of distinct words mapped to hash value "i".

With respect to a second semantic, for $0 \leq i < |HT\_SIZE|$, $(LHT[i]+|HT\_SIZE|) \leq j < (LHT[i+1]+|HT\_SIZE|)$. Also, with respect to the second semantic, (LHT[j]=ID|HF(ID)=i) && (LHT[j1]=LHT[j2] iff j1=j2). Additionally, with respect to the second semantic, LHT[j+|F|]=Frequency (ID).

With respect to a third semantic, for $|HT\_SIZE|+2*|F| \leq i < |HT\_SIZE|+2*|F|+|D|$. Also, with respect to the third semantic, LHT[i]=Position[ID], (where ID is in the order as it appear between |HT_SIZE| and (|HT_SIZE|+|F|−1) of LHT).

Figure 5:
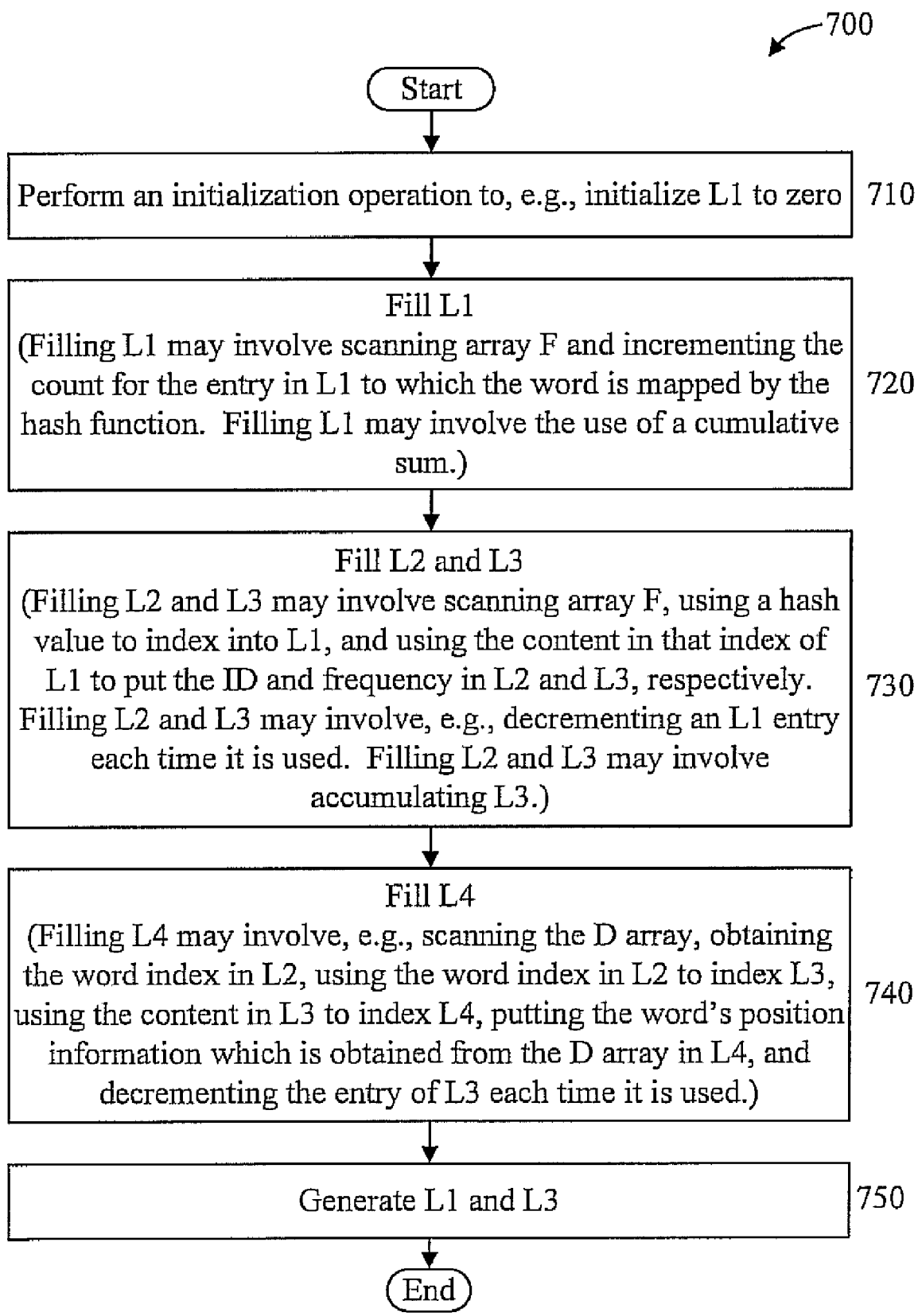
FIG. 5 is a diagram showing a method 700 for serialized LHT generation, in accordance with an embodiment of the present principles.

FIG. 5 is a diagram showing a method 700 for serialized LHT generation, in accordance with an embodiment of the present principles. Method 700 includes steps 710, 720, 730, 740, and 750. FIGS. 6A, 6B, 6C-D, 6E, and 6F are diagrams graphically representing steps 710, 720, 730, 740, and 750, respectively, of FIG. 5, in accordance with an embodiment of the present principles.

Figure 6A:
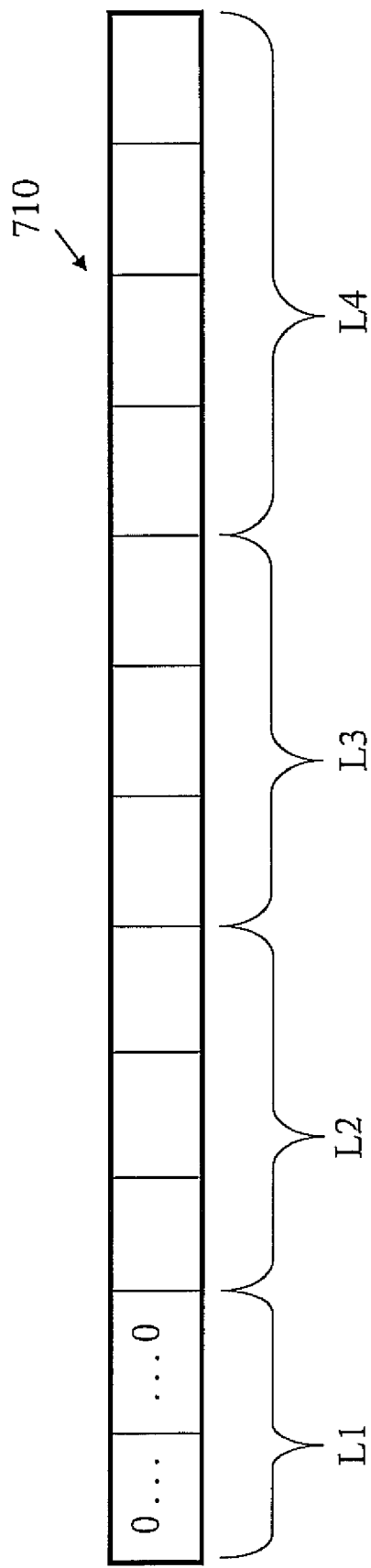

At step 710, and in FIG. 6A, an initialization operation is performed to, for example, initialize L1 to zero.

Figure 6B:
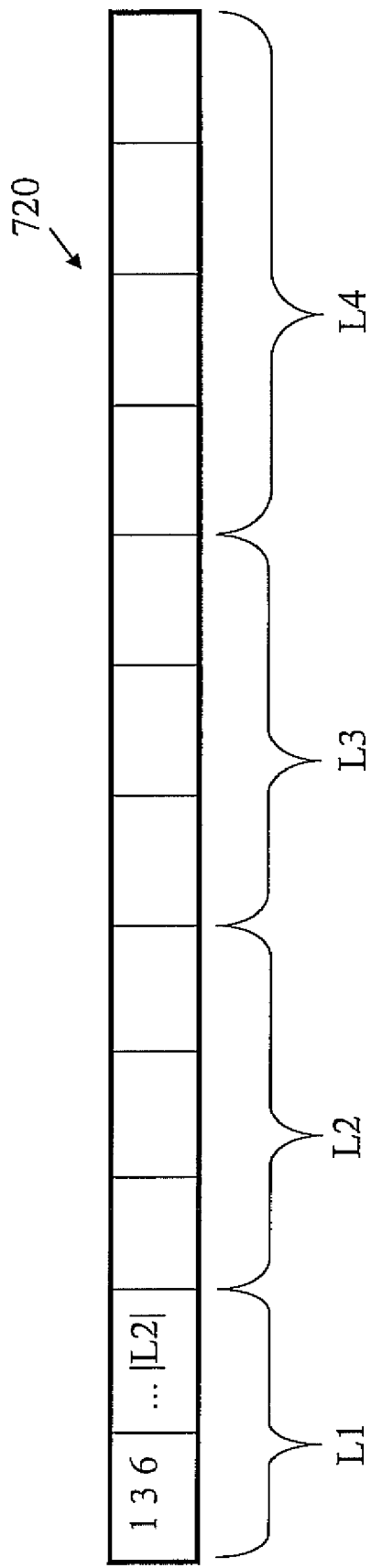

At step 720, and in FIG. 6B, L1 is filled. For example, step 720 may involve scanning array F and increment the count for the entry in L1 to which the word is mapped by the hash function. In an embodiment, a cumulative sum of L1 is used.

Figure 6C:
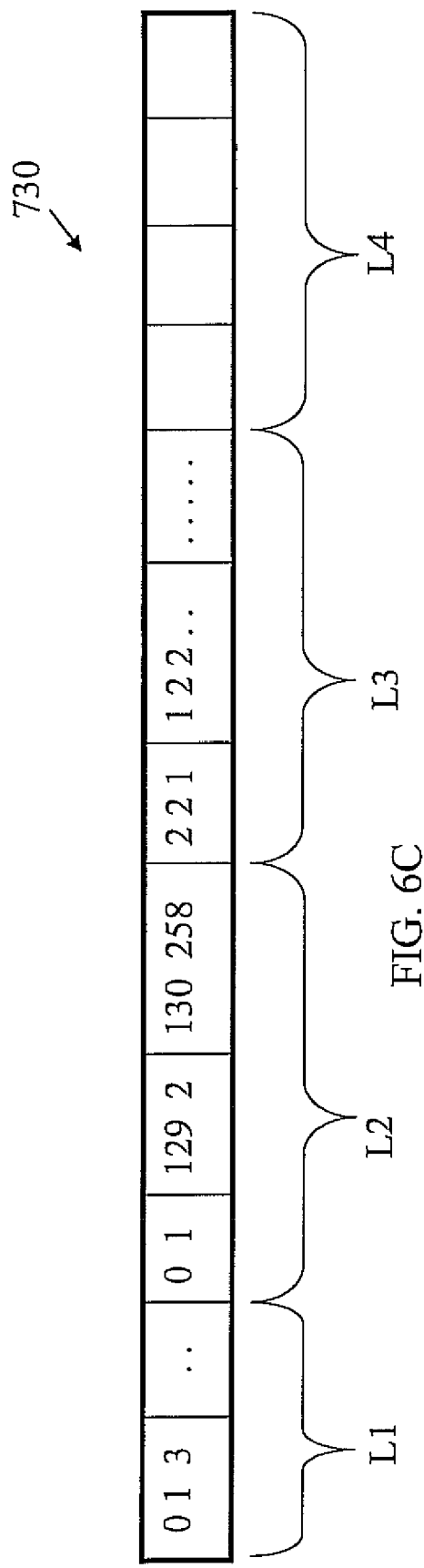
Figure 6D:
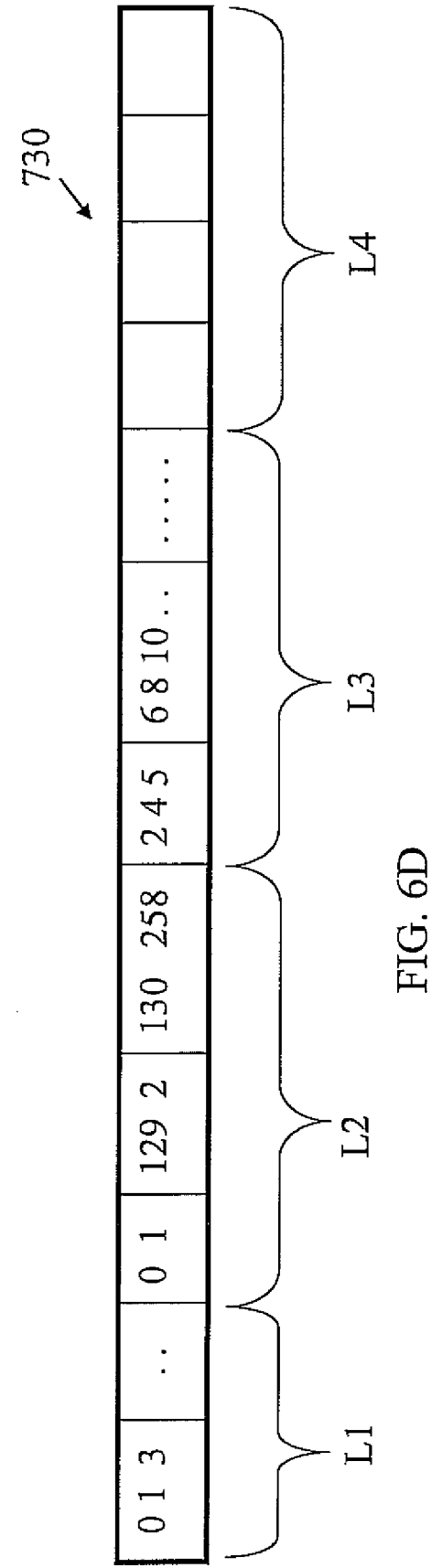

At step 730, and in FIGS. 6C and 8D, L2 and L3 are filled. For example, step 730 may involve scanning array F, using a hash value to index into L1, and using the content in that index of L1 to put the ID and frequency in L2 and L3, respectively. Moreover, step 730 may involve, for example, decrementing an L1 entry each time it is used. Further, step 730 may involve accumulating L3.

At step 740, and in FIG. 6E, L4 is filled. Step 740 may involve, for example, scanning the D array, obtaining the word index in L2, using the word index in L2 to index L3, using the content in L3 to index L4, and putting the word's position information which is obtained from the D array in L4. The entry of L3 is decremented each time it is used.

At step 750, and in FIG. 6F, L1 and L3 are regenerated.

Figure 7:
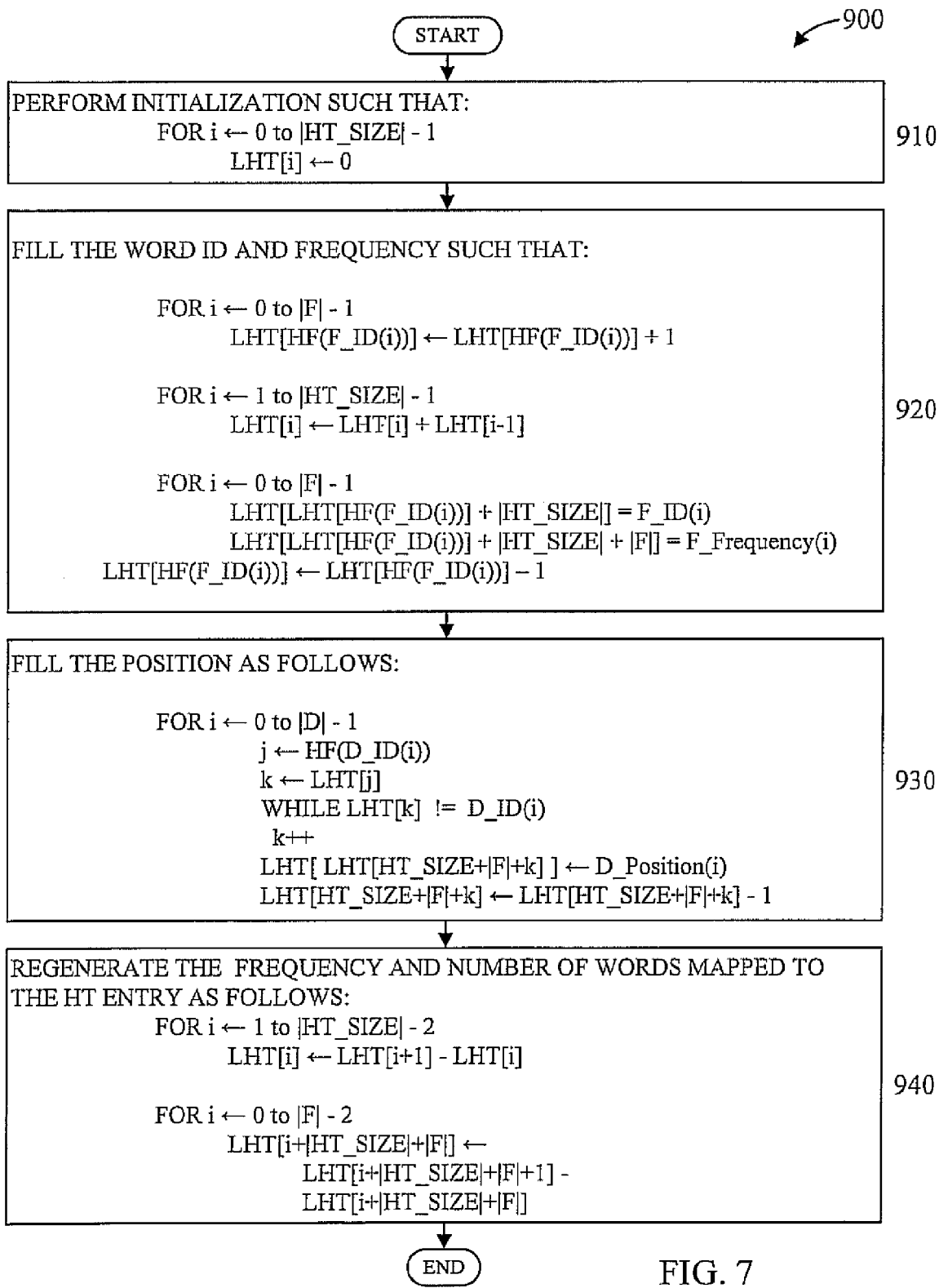
FIG. 7 is a diagram further showing the method for serialized LHT generation of FIGS. 7 and 8A-F in further detail, in accordance with an embodiment of the present principles.

FIG. 7 is a diagram further showing the method for serialized LHT generation of FIGS. 5 and 6A-F in further detail, in accordance with an embodiment of the present principles.

At step 910, initialization is performed such that:

```
FOR i ← 0 to |HT_SIZE| − 1
    LHT[i] ← 0.
```

At step 920, the word ID and frequency are filled such that:

```
FOR i ← 0 to |F| − 1
    LHT[HF(F_ID(i))] ← LHT[HF(F_ID(i))] + 1
FOR i ← 1 to |HT_SIZE| − 1
    LHT[i] ← LHT[i] + LHT[i−1]
FOR i ← 0 to |F| − 1
    LHT[LHT[HF(F_ID(i))] + |HT_SIZE|] = F_ID(i)
    LHT[LHT[HF(F_ID(i))] + |HT_SIZE| + |F|] =
F_Frequency(i)
    LHT[HF(F_ID(i))] ← LHT[HF(F_ID(i))] − 1
FOR i ← |HT_SIZE| + |F| to |HT_SIZE| + 2* |F| − 1
    LHT[i] ← LHT[i] + LHT[i−1]
```

At step 930, the position is filled as follows:

```
FOR i ← 0 to |D| - 1
    j ← HF(D_ID(i))
    k ← LHT[j]
    WHILE LHT[k] != D_ID(i)
        k++
    LHT[ LHT[HT_SIZE+|F|+k] ] ←
D_Position(i)
        LHT[HT_SIZE+|F|+k] ← LHT[HT_SIZE+|F|+k] - 1
```

At step 940, the frequency and number of words mapped to the HT entry are regenerated as follows:

```
FOR i ← 1 to |HT_SIZE| - 2
    LHT[i] ← LHT[i+1] - LHT[i]
FOR i ← 0 to |F| - 2
    LHT[i+|HT_SIZE|+|F|] ←
        LHT[i+|HT_SIZE|+|F|+1] -
        LHT[i+|HT_SIZE|+|F|]
```

The interval hash table (IHT) will now be described generally, following by a further description thereof with respect to FIGS. 8A, 8B, and 8C.

The IHT helps in scalable distributed indexing by providing the ability to offload the construction of the index for a set of documents to another processor before merging that index the GHT.

Each term in the IHT points to a list of documentIDs that include that term. Each entry in this list includes the documentID, the term-frequency in that document, and a pointer to the postings data for that term in the document. For IHT construction, first, the posting table for each of the "k" documents is formed without any need for sorting of terms. Then these posting tables are used to construct the IHT that stores the positions for term occurrences in these "k" documents.

The IHT is then encoded into two contiguous arrays as follows: a first array that allows hash-function based access into the term/document frequency data; and a second array for actual positions data of the terms in the "k" documents).

Figure 8A:
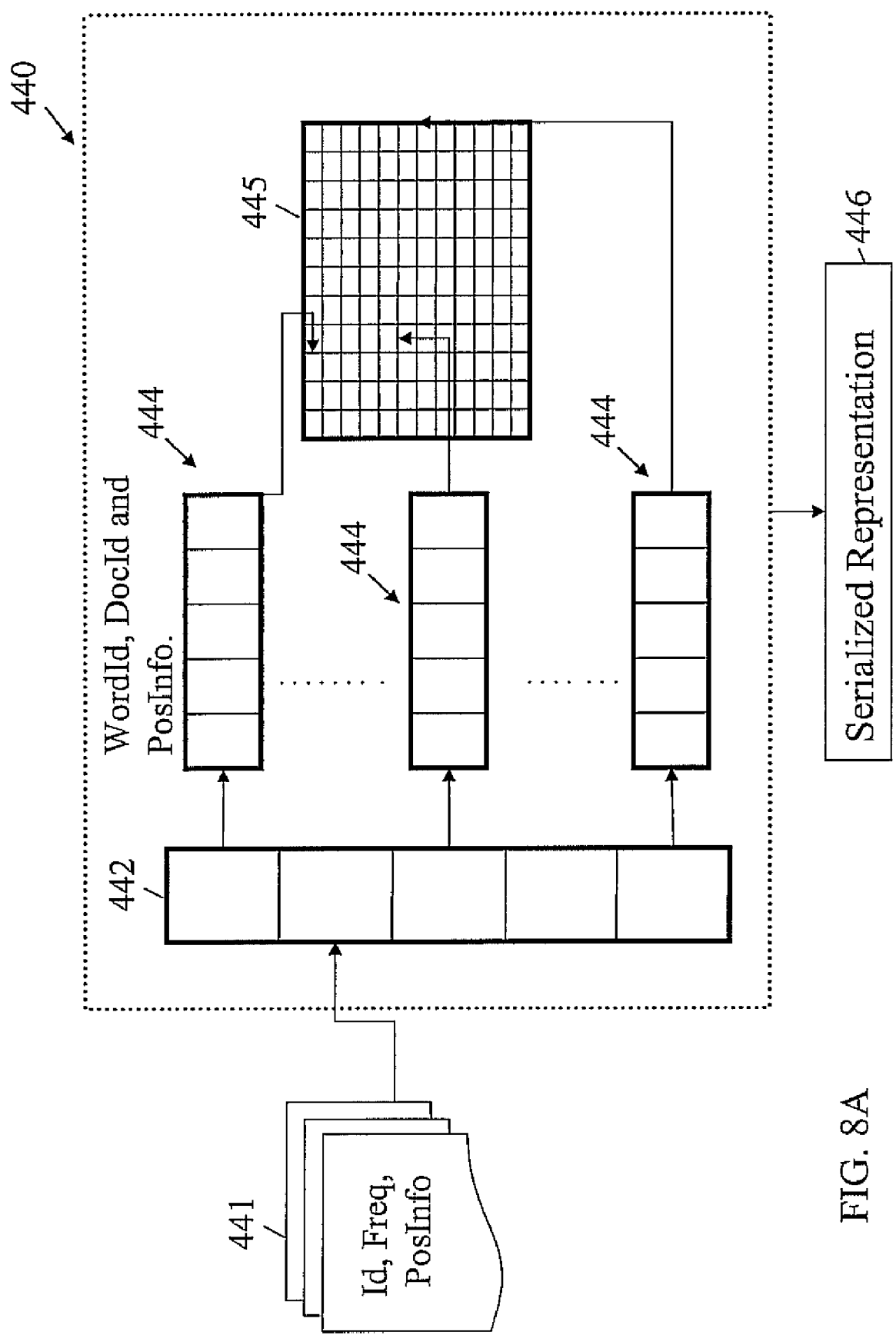
FIG. 8A is a diagram showing the formation 440 of an interval hash table (IHT), in accordance with an embodiment of the present principles.

FIG. 8A is a diagram showing the formation 440 of an interval hash table (IHT), in accordance with an embodiment of the present principles.

From the LHT 441, ID, frequency (Freq), and position information (PosInfo) is obtained for use in creating a hash table 442. FIG. 8A represents an efficient way of generating IHT using a statically allocated array and a residual/secondary array. Herein below, the fixed/primary array and the residual/secondary arrays are explained in detail. In FIG. 8A, 442 along with 5 entries per term reflect the hash-table used for IHT construction. When the number of terms in a hash-index goes beyond 4, then another space for 4 terms are allocated in the overflow-box 445 and a pointer is set to the beginning of this allocated space. The new term for this hash-index is assigned to the first element in this new allocation in the overflow box 445. Similarly, only 4 documents per term are assumed and only (4+1) entries are created per term in the fixed hash-table (primary array). When the number of documents for a term exceeds 4, then a new contiguous set of 4 elements is allocated in the overflow box 445 (residual/secondary array) and then the pointer (5$^{th}$ entry) is set to the new allocation in the overflow box and that location in the overflow box is filled with the ID of the 5$^{th}$ document that just came in and contains that term.

The reference character $T_i$ represents the i$^{th}$ term occurring in a given document. The reference characters HF denote a hash function. The reference character $D_i$ denotes the i$^{th}$ document. The reference character $D_j$ denotes the j$^{th}$ document.

With respect to performance considerations for the IHTs, an IHT may be modeled in a fixed "primary" array and a secondary "residual" array. The number of LHTs in an IHT is pre-known. However, the distribution of terms in the documents and the number of occurrences of a term in a document is not known. This makes static sequential array allocation for IHT difficult. However, one can use the fact that on average the number of documents per term is small. Thus, two arrays are used in the construction of the IHT. They are both statically allocated based on size estimates. During the construction of the IHT, initially the first "primary" array is filled up. Here fixed "k" document entries per term of IHT are assumed. In FIG. 8A, the value of 'k' is chosen as 4. When the (k+1)$^{th}$ document entry comes for this term then it is written to the next available location in the secondary "residual" array. A fixed size "X" of locations are reserved for the next occurrence of the document for the same term. A pointer is set from the appropriate location in the "primary" array to the location of the (k+1)$^{th}$ document entry in the "residual" array. The pointers form a chain when a lot of documents occur for the same term.

Moreover, with respect to such modeling, a fixed size array model for average statistics on termFreq and DocFreq per term may be used. Further, the residual array may be used to deal with overflows in the fixed array using, for example, offsets. Also, a couple of mallocs may be used (which saves repeated calls to malloc (memory allocation) in the original un-optimized code. Additionally, serialization is faster than from a pointer based hash table. Moreover, improved cache performance is obtained from such modeling.

Figure 8B:
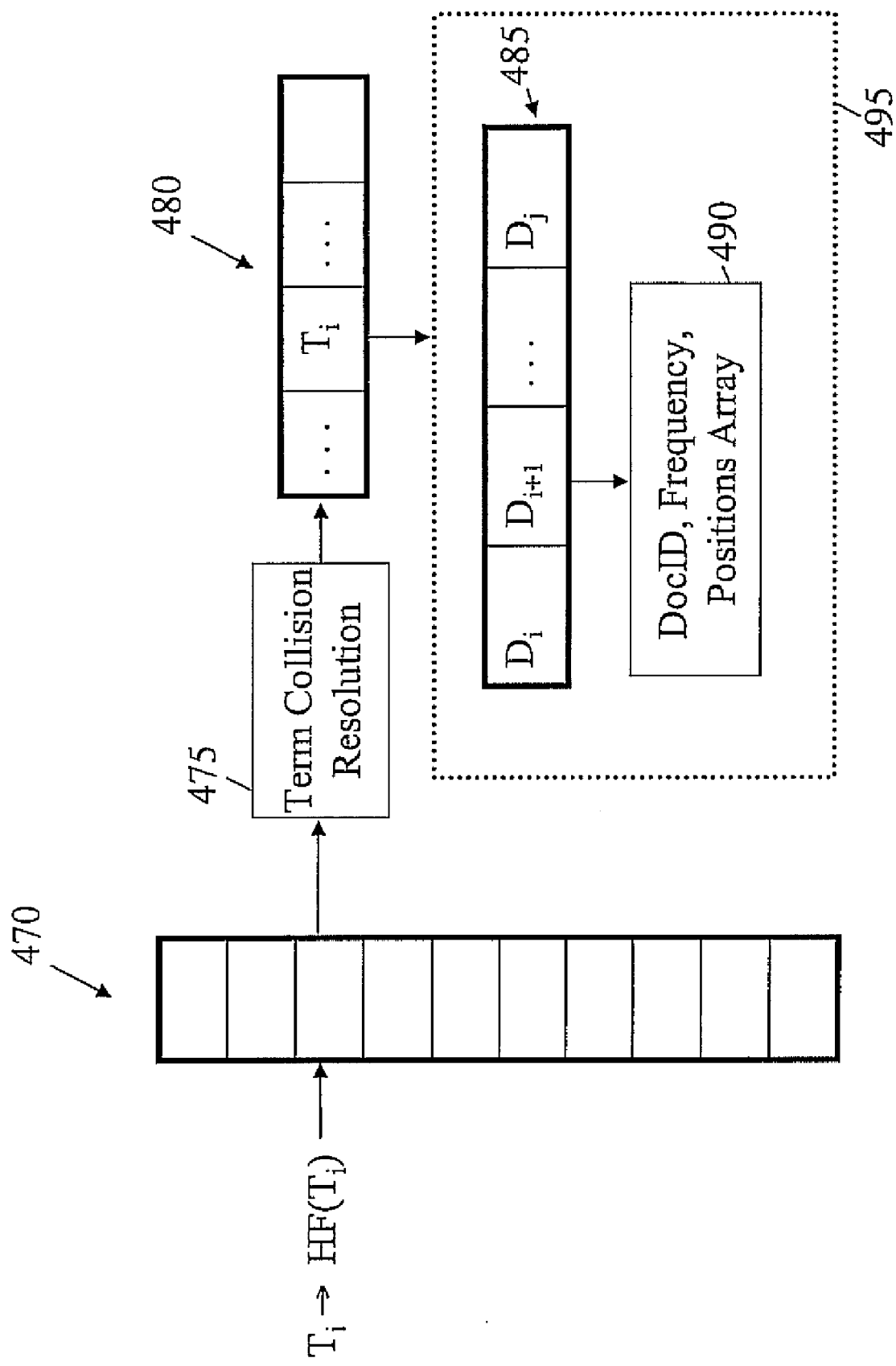
FIG. 8B is a diagram showing an interval hash table (IHT) 470, in accordance with an embodiment of the present principles.

FIG. 8B is a diagram showing an interval hash table (IHT) 470, in accordance with an embodiment of the present principles.

Term collision resolution 475 is used on terms 480 occurring in documents 485. The documents 485 include IHT data 495 corresponding to the documents 485 and the terms 480 occurring therein. The IHT data 495 may include term related information 490 such as, for example, DocID (the identifier of the document in which a term occurs), frequency (of occurrence of a term), positions in an array (of a term), and so forth.

Figure 8C:
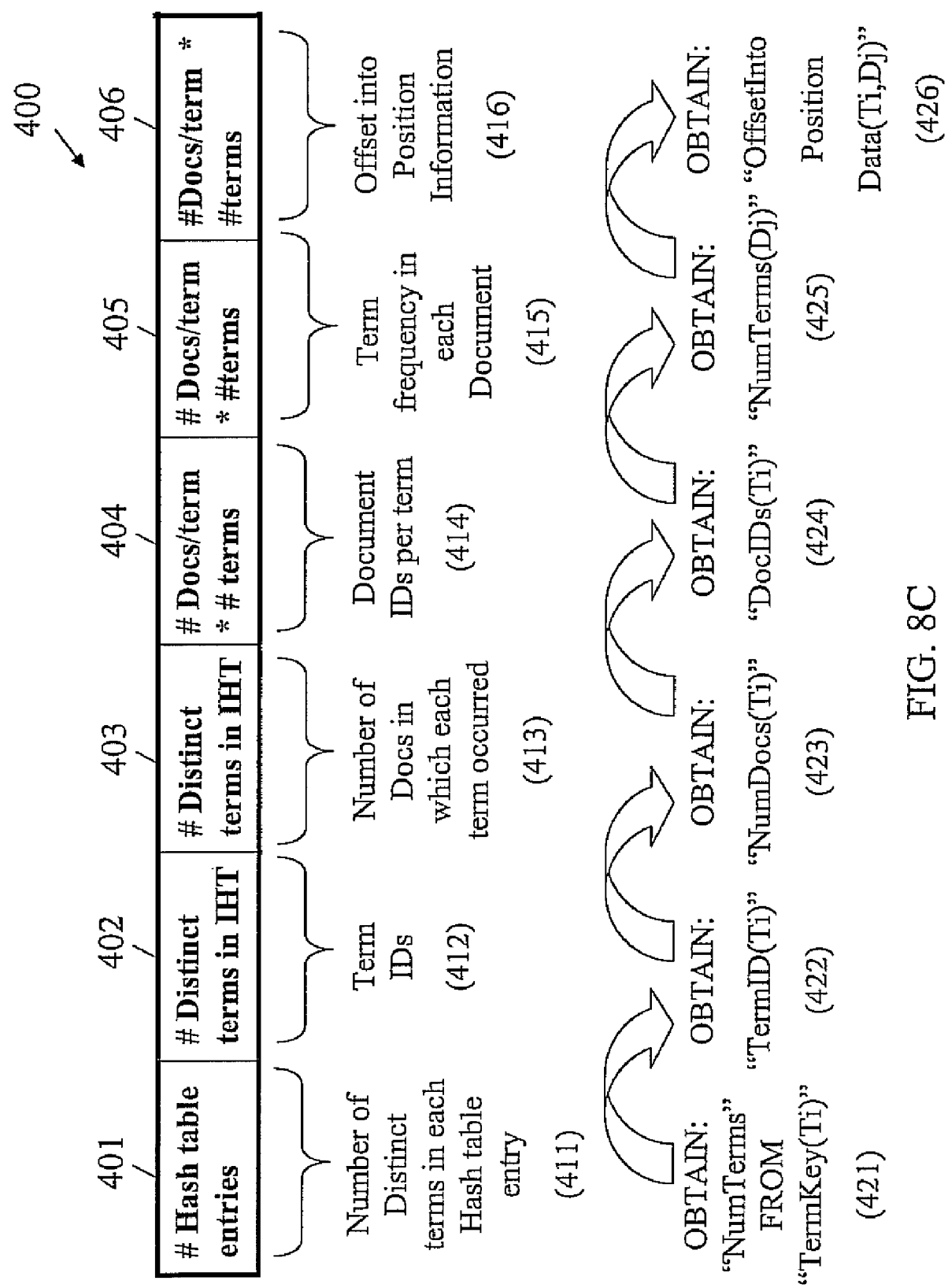
FIG. 8C is a diagram showing an encoded interval hash table (IHT) representation 400, in accordance with an embodiment of the present principles.

FIG. 8C is a diagram showing an encoded interval hash table (IHT) representation 400, in accordance with an embodiment of the present principles. The encoded IHT representation 400 involves six sub-arrays and shows the steps to retrieve term positions in a document. The size of each of the six sub-arrays are respectively denoted as follows: number (#) of hash table entries 401; number (#) of distinct terms in IHT 402; number (#) of distinct terms in IHT 403; number (#) of documents/term*number (#) of terms 404; number (#) of documents/term*number (#) of terms 405; and number (#) of documents/term*number (#) of terms 406.

The first sub-array, having a size denoted by 401, represents the number of distinct terms in each hash table entry 411. The second sub-array, having a size denoted by 402, represents the term IDs 412. The third sub-array, having a size denoted by 403, represents the number of documents in which each term occurred 413. The fourth sub-array, having a size denoted by 404, represents document IDs per term 414. The fifth sub-array, having a size denoted by 405, represents the term frequency in each document 415. The sixth sub-array, having a size denoted by 406, represents an offset into position information 416.

With respect to the first sub-array, having a size denoted by 401, an access step 421 corresponding thereto involves obtaining NumTerms from TermKey(Ti). With respect to the second sub-array, having a size denoted by 402, an access step 422 corresponding thereto involves obtaining TermID(Ti). With respect to the third sub-array, having a size denoted by 403, an access step 423 corresponding thereto involves obtaining NumDocs(Ti). With respect to the fourth sub-array, having a size denoted by 404, an access step 424 corresponding thereto involves obtaining DocIDs(Ti). With respect to the fifth sub-array, having a size denoted by 405, an access step 425 corresponding thereto involves obtaining NumTerms (Dj). With respect to the sixth sub-array, having a size denoted by 406, an access step 426 corresponding thereto involves obtaining OffsetIntoPositionData(Ti, Dj).

Given, a term "T(i)" and document "D(j)", we perform random-access on the sub-arrays, one-by-one, to finally get the positions of occurrence of "T(i)" in "D(j)". This encoding is special in that it keeps the access to the data efficient instead of sequential-traversal based. The encoding allows efficient communication from the processor that produces this IHT to the node that merges the IHT into GHT. This encoding also helps in reducing the memory usage by enabling the application of standard index compression techniques.

The global hash table (GHT) will now be described generally, following by a further description thereof with respect to FIGS. 9A and 9B.

We consider the optimization of the size of the index alongwith indexing time complexity (including IHT and GHT construction) and postings retrieval time during searching. These are conflicting objectives, as in typical space-time optimization issues relating to the simultaneous data-structure-size and algorithm-time-complexity optimization problem. Specifically, we consider minimizing both the GHT construction time and the size of the GHT while maintaining "O(1)" time for insertion in the GHT of a reference to an IHT for a term and, also, "O(1)" time for retrieval of IHT numbers given a term, from the GHT.

We could also consider the problem of determining the optimal value of "k", that is, the number of documents per IHT for minimizing the time for the sequential text indexing algorithm. We can determine optimal points using curves based on real-data.

In the two-dimensional hash-based GHT structure, for every insertion of the pair <term, IHT\#> one has to do doc-interval based hash-function evaluation and collision resolution apart from setting appropriate pointers, which takes "O(1)" time for insertion and retrieval. However, optimization of the size of the GHT becomes harder due to the second level hash-table for document intervals and manipulation of pointers. This is supplemented by memory fragmentation using heap based allocations.

We could consider storing a bit-vector per term. In such a case, every bit represents an IHT and a value of "1" denotes that the term is present in some document of that IHT. However, this can lead to very high memory requirements for the GHT.

Another way of optimizing the size of the GHT is to make the storage proportional to the actual number of doc-intervals per term. Typically, the [term, docinterval] matrix is very sparse. Thus, we take an empirical approach to optimize this index. Instead of storing the complete bitVector, we can simply store the IHT numbers that denote those intervals that include the term. This helps in obtaining a significant reduction in the size of the index. This design is also better for search response time compared to traversing the bitVector (linearly or hierarchically) in the previous design.

Figure 9A:
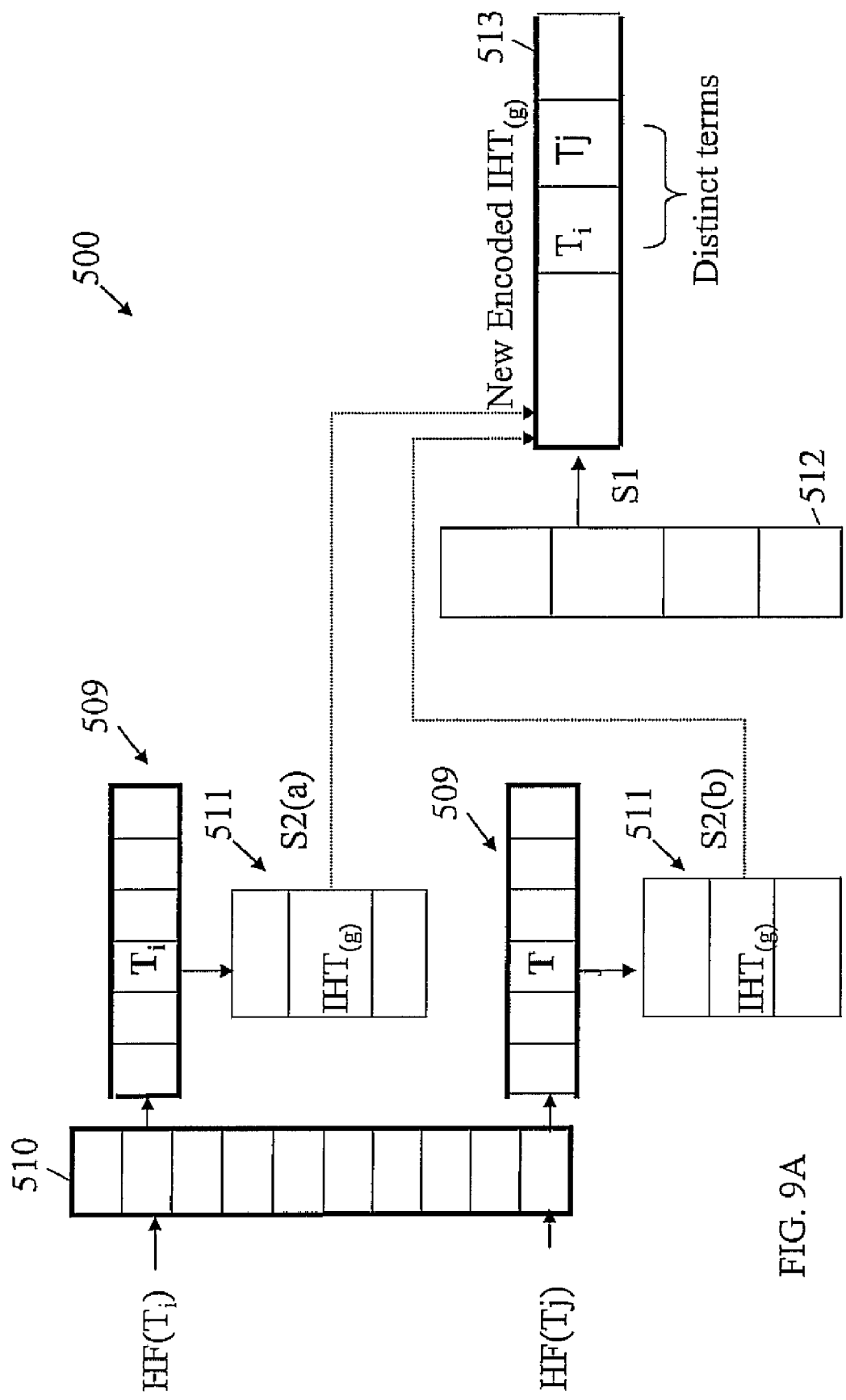
FIG. 9A is a diagram showing the construction 500 of a GHT from an array of IHTs, in accordance with an embodiment of the present principles.

FIG. 9A is a diagram showing the construction 500 of a GHT from an array of IHTs, in accordance with an embodiment of the present principles.

The global hash table 510 is a hash-table where the key is a unique term $(T_j)$ 509 in the document collection and the value is a list 511 of IHT numbers. Each IHT has at least one document that includes that term. Our index also has an array called the "array-of-IHTs" 512 whose each entry point to the IHT corresponding to that document interval. One IHT is index data for the set documents in a document interval. Each index in the "array-of-IHTs" represents a document interval. When an IHT needs to be merged into GHT, then its document interval is obtained and its entry is made in the corresponding index in the "array-of-IHTs". The GHT 510 is constructed by merging IHTs 513 one at a time into the GHT 510. In an embodiment, the steps for merging an IHT 513 into the GHT 510 are as follows:

Insert pointers to the IHT data including the encoded IHT data array and the positions array into the array-of-IHTs 512. This insertion happens at that entry in the array-of-IHTs 512 which represents the document-interval corresponding to the current IHT 513 being read. In FIG. 5A, the entry "g" points to "$IHT_{(g)}$".

The unique term list in the IHT is traversed. For each term, the position of that term is identified in the GHT 510 using hash-function evaluation and term collision resolution. Then, in the IHT-list for that term, the current IHT number is inserted.

Referring back to FIG. 9A with respect to construction of the GHT 510 from IHTs, in a first step denoted by the reference characters S1, "$IHT_{(g)}$" is pointed to by the appropriate location in the array-of-IHTs. In a second step denoted by the reference characters S2(a) and S2(b), "$IHT_{(g)}$" is inserted into both IHT-lists corresponding to the terms $T_i$ and $T_{j\_}$ in the GHT.

The above merge process does not involve re-organizing of the IHT data while merging it into the GHT 510, as compared to conventional text indexing approaches which re-organize the segment data when merging it into the final merged segment. This makes GHT/IHT design efficient for distributed indexing.

Figure 9B:
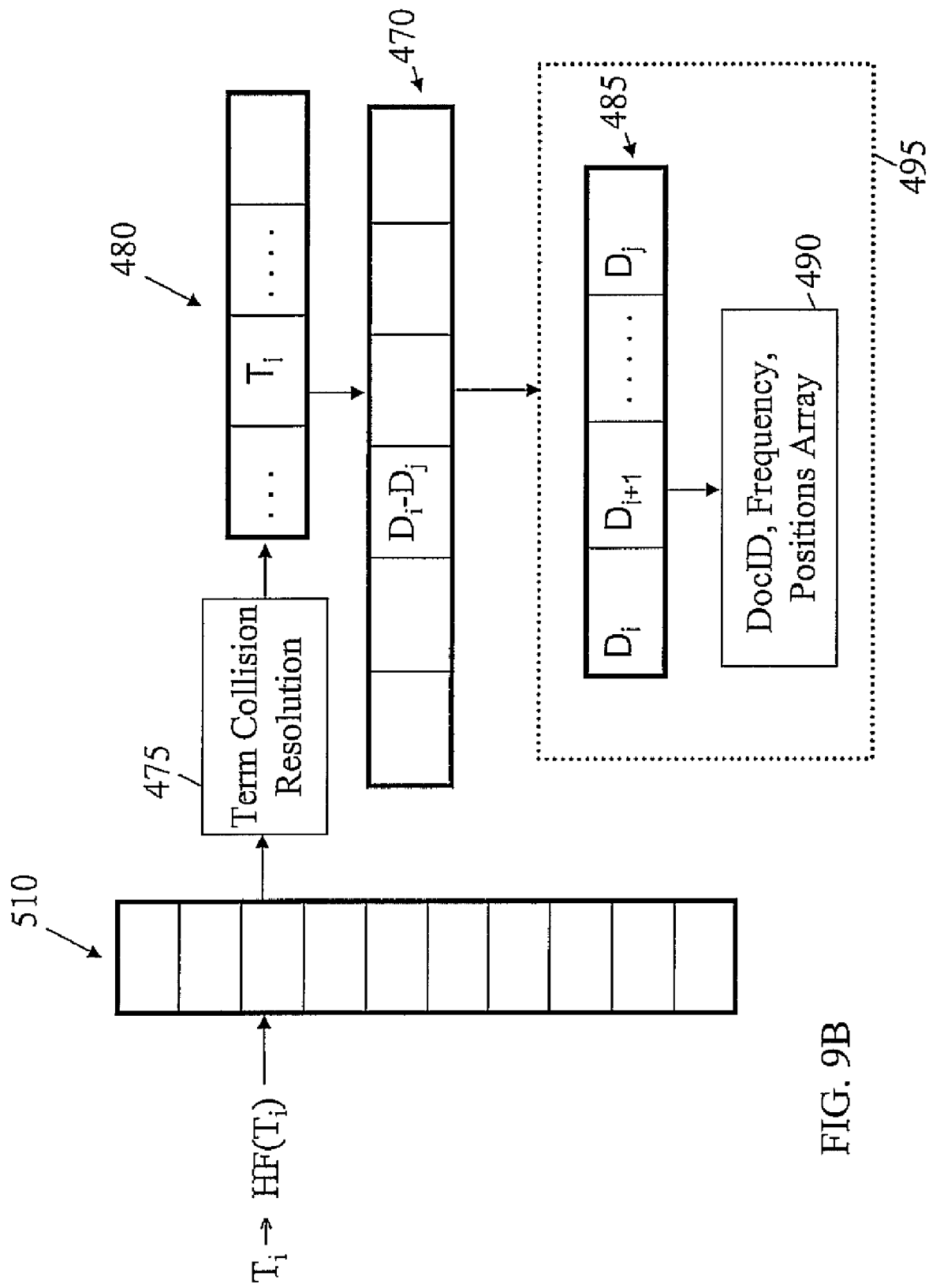
FIG. 9B is a diagram showing a global hash table 510, in accordance with an embodiment of the present principles.

FIG. 9B is a diagram showing a global hash table 510, in accordance with an embodiment of the present principles.

Similar to the IHT 400 of FIG. 8B, term collision resolution 475 is used on terms 480 occurring in documents 485, in order to merge one or more IHTs 470 into the GHT 500. The reference character designations in FIG. 9B are the same as FIG. 8B with respect to reference characters $T_i$, HF, $D_i$, and $D_j$.

A description of an index format on phase-change memory (PCM) with respect to the global hash table (GHT) will now be described. Of course, it is to be appreciated that the present principles are not limited solely to implementations involving phase-change memory and, thus, other memory types may also be used in accordance with the teachings of the present principles, while maintaining the spirit of the present principles.

An in-memory data structure for efficient indexing and merging avoids the overheads of the conventional Lucene format conversion and index merging using sorted terms.

Moreover, with respect to the index format on PCM, GHT indices should be re-located to a phase-change memory. In an embodiment, relocation updates are postponed in order to perform a phase search so as to maximize indexing throughput. In an embodiment, on-demand updates from offsets to real-addresses are provided during the phase search.

Further, with respect to the index format on PCM, a memory manager may be used to create an index in a contiguous space. In an embodiment, the base address for this index (for example, but not limited to a size of, 8 bytes) may be stored.

Also, with respect to the index format on PCM, an adaptive optimization may be performed for the number of indices per query. Such an adaptive optimization may be determined using, for example, search performance metrics.

Dynamic distributed resource sharing and related issues will now be described in accordance with an embodiment of the present principles. With respect to unbalanced streams, in a static resource sharing environment, low resource utilization and poor performance can be expected. Moreover, utilization decreases with increasing imbalance in the input streams. With respect to centralized resource sharing, scaling issues may arise, for example, for a large number of cores. With respect to distributed resource sharing, a scalable design may be provided, with low overheads and a hierarchical approach to scalability. Moreover, distributed load sharing can provide a close to optimal load balance.

Further with respect to the dynamic distributed load sharing, a leaf node cluster may be used, with sharing of resources within the cluster and an optional limited group size (for example, but not limited to, 4 to 8 members in the group). The cluster hierarchy may involve, for example: clusters that include lower level clusters; a tree topology for a hierarchical structure of the clusters. Tree topology parameters may be determined by, for example, experimentation and modeling (using, for example, underlying interconnect topology). Optimal values may be used for a branching factor and the depth of the tree.

Also with respect to the dynamic distributed resource sharing, a run-time resource sharing protocol may be used. In an embodiment, the same level communication (closer nodes) followed by higher level communication (distant nodes) may be implemented. Control mode time minimization may be utilized to reduce protocol overheads. An incremental need-based propagation to higher levels approach may be used. For example, a push model may be used such that, for example, heavily loaded clusters push unsatisfied demand to higher levels. Moreover, for example, a pull model may be used such that lightly loaded clusters initiate the request for more work. Preferably, the run-time resource sharing protocol is scalable to a large number of nodes, for example, using a hierarchical model with tunable parameters.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. In a parallel pipelined structure on a multi-core device, a method for parallel pipelined multi-core indexing, comprising the steps of:
    generating one or more single document indexes respectively corresponding to one or more single documents of a given data stream;
    generating one or more multi-document interval-based hash tables from the one or more single document indexes;
    modeling at least one of the multi-document interval-based hash tables in a fixed array and a residual array, wherein overflows in the fixed array are represented in the residual array using offsets; and
    generating one or more global hash tables formed from merging one or more of the multi-document interval-based hash tables, all of the one or more global hash tables representing a collective index for all of the single documents for which the one or more single document indexes were generated, wherein merging one or more of the multi-document interval-based hash tables comprises using term-based partitioning to reduce a compute unit load relating to the merging by distributing the compute unit load onto at least some of a plurality of compute units of the multi-core device.

2. The method of claim 1, further comprising performing term clustering to optimize the merging of the one or more of the multi-document interval-based hash tables into the one or more global hash tables.

3. The method of claim 1, wherein a given one of the single document indexes comprises a first set of variables for denoting a number of distinct words from a respective one of the single documents that are mapped to the given one of the single document indexes, a second set of variables for denoting identifiers of the distinct words, a third set of variables for denoting word frequencies of the distinct words occurring in the respective one of the single documents, and a fourth set of variables for denoting positions of at least the distinct words in the respective one of the single documents.

4. The method of claim 3, wherein the identifiers of the distinct words denoted by the second set of variables are comprised in the given one of the single document indexes in an order corresponding to respective hash values for the distinct words.

5. The method of claim 1, wherein the residual array is scalable, and wherein a fixed number of document entries per term are stored in the fixed array such that a next available location in the residual array is written to when an overall number of the document entries per term exceed the fixed number.

6. The method of claim 1, further comprising storing at least the one or more global hash tables in a phase-change memory, and wherein a phase search is performed on the phase-change memory to optimize indexing throughput.

7. The method of claim 1, wherein the one or more multi-document interval-based hash tables are at least one of document-interval-based and term-interval-based.

8. The method of claim 1, wherein the multi-core device has a global address space and a plurality of coherence domains, each of the plurality of coherence domains having a respective corresponding set of compute units, and wherein said step of generating the one or more multi-document interval-based hash tables comprises:
    generating the one or more multi-document interval-based hash tables as an array; and
    configuring the array to be stored across at least some of the compute units in the respective corresponding set of compute units of at least some of the plurality of coherence domains using a dynamic memory allocation process.

9. The method of claim 1, wherein the multi-core device has a plurality of compute units, and wherein said step of generating the one or more global hash tables comprises generating more than one global hash table formed from merging the one or more of the multi-document interval-based hash tables.

10. The method of claim 9, wherein each of the more than one global hash table respectively represents an incomplete index for the one or more single documents that includes less than all terms occurring in the one or more single documents, and all of the more than one global hash table represents a complete index for the one or more single documents.

11. The method of claim 1, wherein the multi-core device has a global address space and a plurality of coherence domains, each of the plurality of coherence domains having a respective corresponding set of compute units, and wherein the method processes multiple incoming streams, and further comprises the step of configuring a hierarchical organization of clusters and push-pull models of input stream load across the clusters to provide a dynamic and distributed load balance, the clusters comprising the set of compute units for each of the plurality of coherence domains.

12. The method of claim 1, wherein the one or more multi-document interval-based hash tables are encoded in a contiguous memory array to enable searching for the one or more single documents and terms in the one or more single documents.

13. A program storage device readable by machine, tangibly embodying a program of instructions executable by the machine to perform method steps for parallel pipelined multi-core indexing in a parallel pipelined structure on a multi-core device, the method steps comprising:
   generating one or more single document indexes respectively corresponding to one or more single documents of a given data stream;
   generating one or more multi-document interval-based hash tables from the one or more single document indexes;
   modeling at least one of the multi-document interval-based hash tables in a fixed array and a residual array, wherein overflows in the fixed array are represented in the residual array using offsets; and
   generating one or more global hash tables formed from merging one or more of the multi-document interval-based hash tables, all of the one or more global hash tables representing a collective index for all of the single documents for which the one or more single document indexes were generated, wherein merging one or more of the multi-document interval-based hash tables comprises using term-based partitioning to reduce a compute unit load relating to the merging by distributing the compute unit load onto at least some of a plurality of compute units of the multi-core device.

14. The program storage device of claim 13, further comprising performing term clustering to optimize the merging of the one or more of the multi-document interval-based hash tables into the one or more global hash tables.

15. The program storage device of claim 13, wherein a given one of the single document indexes comprises a first set of variables for denoting a number of distinct words from a respective one of the single documents that are mapped to the given one of the single document indexes, a second set of variables for denoting identifiers of the distinct words, a third set of variables for denoting word frequencies of the distinct words occurring in the respective one of the single documents, and a fourth set of variables for denoting positions of at least the distinct words in the respective one of the single documents.

16. The program storage device of claim 15, wherein the identifiers of the distinct words denoted by the second set of variables are comprised in the given one of the single document indexes in an order corresponding to respective hash values for the distinct words.

17. The program storage device of claim 13, wherein the residual array is scalable, and wherein a fixed number of document entries per term are stored in the fixed array such that a next available location in the residual array is written to when an overall number of the document entries per term exceed the fixed number.

18. The program storage device of claim 13, further comprising storing at least the one or more global hash tables in a phase-change memory, and wherein a phase search is performed on the phase-change memory to optimize indexing throughput.

19. The program storage device of claim 13, wherein the one or more multi-document interval-based hash tables are at least one of document-interval-based and term-interval-based.

20. The program storage device of claim 13, wherein the multi-core device has a global address space and a plurality of coherence domains, each of the plurality of coherence domains having a respective corresponding set of compute units, and wherein said step of generating the one or more multi-document interval-based hash tables comprises:
   generating the one or more multi-document interval-based hash tables as an array; and
   configuring the array to be stored across at least some of the compute units in the respective corresponding set of compute units of at least some of the plurality of coherence domains using a dynamic memory allocation process.

21. The program storage device of claim 13, wherein the multi-core device has a plurality of compute units, and wherein said step of generating the one or more global hash tables comprises generating more than one global hash table formed from merging the one or more of the multi-document interval-based hash tables.

22. The program storage device of claim 21, wherein each of the more than one global hash table respectively represents an incomplete index for the one or more single documents that includes less than all terms occurring in the one or more single documents, and all of the more than one global hash table represents a complete index for the one or more single documents.

23. The program storage device of claim 13, wherein the one or more multi-document interval-based hash tables are encoded in a contiguous memory array to enable searching for the one or more single documents and terms in the one or more single documents.

* * * * *